United States Patent
Atsumi et al.

(10) Patent No.: US 6,351,252 B1
(45) Date of Patent: Feb. 26, 2002

(54) HEAD-MOUNTED PICTURE DISPLAY DEVICE

(75) Inventors: Motohiro Atsumi; Yoshihiro Maeda, both of Hachioji (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/287,909

(22) Filed: Apr. 7, 1999

(30) Foreign Application Priority Data

Apr. 10, 1998 (JP) .......................................... 10-099510
Jun. 16, 1998 (JP) .......................................... 10-168786

(51) Int. Cl.[7] .............................................. G06T 11/00
(52) U.S. Cl. ......................................................... 345/8
(58) Field of Search ........................... 345/7–9; 349/62; 351/153, 158

(56) References Cited

U.S. PATENT DOCUMENTS

| 5,276,471 A | * | 1/1994 | Yamauch et al. | ........... 351/153 |
|---|---|---|---|---|
| 5,539,422 A | * | 7/1996 | Heacock et al. | ............... 345/8 |
| 5,671,037 A | * | 9/1997 | Ogasawara et al. | ......... 351/158 |
| 5,815,126 A | * | 9/1998 | Fan et al. | ....................... 345/8 |
| 5,929,951 A | * | 7/1999 | Sasakura et al. | .............. 349/62 |

FOREIGN PATENT DOCUMENTS

JP             8-62546        3/1996

* cited by examiner

*Primary Examiner*—Almis R. Jankus
(74) *Attorney, Agent, or Firm*—Ostrolenk, Faber, Gerb & Soffen, LLP

(57) ABSTRACT

The present invention provides a head-mounted picture display device including a picture display system, a housing body, left and right supporting frames, and joint members. The picture display system includes picture display elements for producing pictures represented by a supplied video signal, and prisms for introducing beams transmitting the pictures produced by the picture display elements to the observer's eyes. The housing body accommodates the picture display system while the left and right supporting frames are adapted to be worn are on the observer's left and right ears for supporting the housing body in an observable position. The joint members link the housing body and the left and right supporting frames.

9 Claims, 8 Drawing Sheets

HEAD-MOUNTED PICTURE DISPLAY DEVICE

BACKGROUND OF THE INVENTION

1. Field of the Invention

The present invention relates to a head-mounted picture display device. More particularly, this invention is concerned with a head-mounted picture display device having a picture display system. The picture display system includes picture display members for producing pictures represented by a supplied picture signal, and prisms for introducing beams which transmit the pictures produced by the picture display members to the observer's eyes.

2. Description of the Related Art

In recent years, various head-mounted picture display devices including a head-mounted display (HMD) have been proposed as compact display devices for displaying a picture and transmitting sound associated with the picture, and put to practical use generally. The compact display devices are used to view pictures or to play various kinds of games.

The head-mounted picture display device (hereinafter referred to as a HMD) is generally composed of a picture display system, a housing body, and supporting members. The picture display system includes compact liquid crystal displays (hereinafter LCDs) formed with display elements for visualizing pictures, and an optical system including prisms for projecting pictures produced by the LCDs onto the user's retinas. Drive circuits for driving the LCDs are incorporated in the housing body. The supporting members are included for supporting the housing body on the front side of the user's head.

Generally, frames are structured to have bows attached to the left and right edges of a front frame in which lenses are mounted, so as to be able to pivot freely. The bows are placed on the observer's ears, whereby the lenses can be retained in front of the eyes.

An example of such frames has been described in, for example, Japanese Unexamined Patent Publication No. 8-62546. Specifically, V-shaped slits opening inward are formed at the left and right edges of a front frame in which lenses are mounted. Cylindrical concave parts are extending in the bottoms of the V-shaped slits. Cylindrical pin members attached to the ends of the left and right bows are press-fitted in the cylindrical concave parts so that the pin members can be removed freely. The patent publication discloses that a polycarbonate resin is used to make the frames.

The foregoing head-mounted picture display device has been made to be lightweight in recent years. Accordingly, proposals have been made for a head-mounted picture display device in which supporting frames shaped analogously to the bows of the frames are employed and a housing body accommodating the picture display system is borne by the observer's head.

However, the aforesaid HMD proposed in the past is generally designed to be worn so as to partly mask the user's face.

The thus designed HMD, that is, the HMD which is worn so as to partly mask the user's face will be discussed briefly. When a user wears the HMD to view a picture or the like, supporting members press against the user's head. The user will therefore feel the exertion of pressure. If the HMD is worn over a prolonged period of time, it may make the user uncomfortable.

Moreover, in an HMD having supporting members designed to mask a large portion of the user's head and face, the weight of the supporting members themselves is increased. If various functions are to be included, components for realizing such functions must be added. This leads to an additional increase in the weight of the HMD itself. Discomfort attributed to a user wearing the HMD will thus further increase.

The aforesaid head-mounted picture display device is, unlike the aforesaid frames that should be sized to fit a specific user, used by a plurality of observers whose heads are of various sizes. Supporting frames for supporting the HMD can preferably withstand a wide range of stresses and readily exhibit a spring force. The polycarbonate resin described as the material used to make the frames in Japanese Unexamined Patent Publication No. 8-62546 is not fully satisfactory from this standpoint.

Many users of the HMD use hair treatment agents. The hair treatment agents contain various chemicals. Among the chemicals, for example, alcohol may reportedly cause a resin to deteriorate. The supporting frames are members typically exposed to a user's hair. The chemicals often adhere to the supporting frames. The supporting frames must therefore be made to resist the chemicals. As far as the polycarbonate resin is concerned, when stress is exerted thereon by user contact after being exposed to the chemicals, it tends to deteriorate with the passage of time and then break abruptly. From this standpoint also, the polycarbonate resin is not fully satisfactory.

SUMMARY OF THE INVENTION

The first object of the present invention is to provide a compact and lightweight head-mounted picture display device.

The second object of the present invention is to provide a head-mounted picture display that is comfortably worn.

The third object of the present invention is to provide a head-mounted picture display device offering excellent maneuverability.

The fourth object of the present invention is to provide a head-mounted picture display device in which various functional units are simplified in order to improve wearing comfort, realize a compact and lightweight design, and offer excellent maneuverability.

The fifth object of the present invention is to provide a head-mounted picture display device which can be exchangeable among observers whose head sizes fall within a wide range.

The sixth object of the present invention is to provide a highly reliable head-mounted picture display device that is chemical-resistant.

The seventh object of the present invention is to provide a highly reliable head-mounted picture display device that is exchangeable among observers whose head sizes fall within a wide range due to its elasticity, and is also chemical-resistant.

Briefly, the present invention provides a head-mounted display picture display device comprising a picture display system, a housing body, left and right supporting frames, and joint members. The picture display system includes picture display members for producing pictures represented by a supplied video signal and prisms for introducing beams which transmit the pictures produced by the picture display members to the observer's eyes. The housing body accommodates the picture display system. The left and right supporting frames are put on the observer's left and right ears, thus supporting the housing body in an observable posture. The joint members link the housing body and the left and right supporting frames. The housing body is realized by joining a back housing body and a front housing body. The back housing body occupies a position relatively close to the observer's face with the display device mounted on the observer's head. The front housing body occupies a position relatively away from the observer's face with the display device mounted on the observer's head. The upper and lower parts of the joined surfaces of the back and front housing bodies with respect to apertures in which the joint members are fitted are displaced from each other in terms of their back-to-front positions.

These objects and advantages of the present invention will become further apparent from the following detailed explanation.

DESCRIPTION OF THE PREFERRED EMBODIMENT

An embodiment of the present invention will be described with reference to the drawings.

Figure 1:
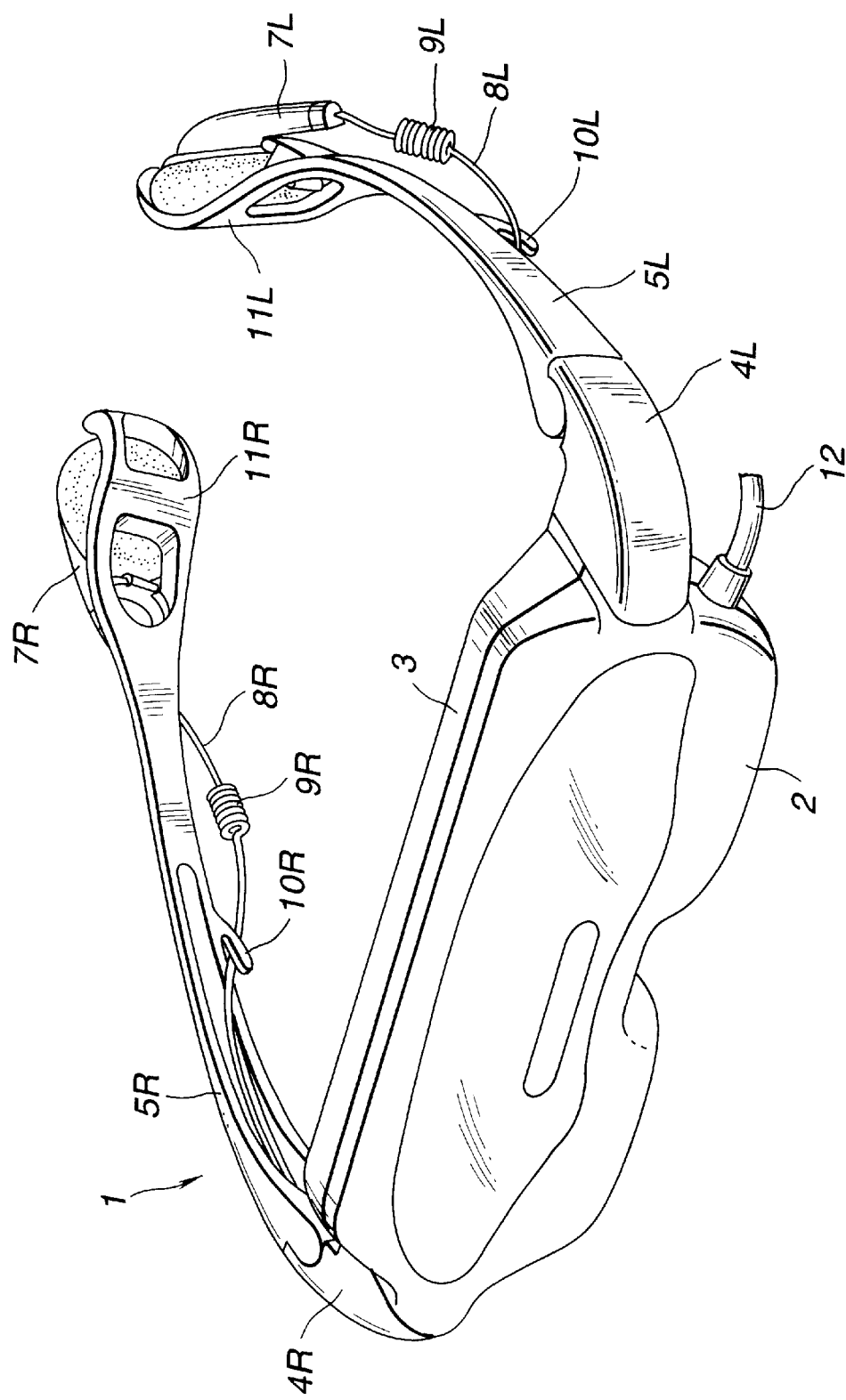
FIG. 1 is an oblique view showing the overall configuration of a head-mounted picture display device in accordance with an embodiment of the present invention as seen from the front face thereof.
Figure 2:
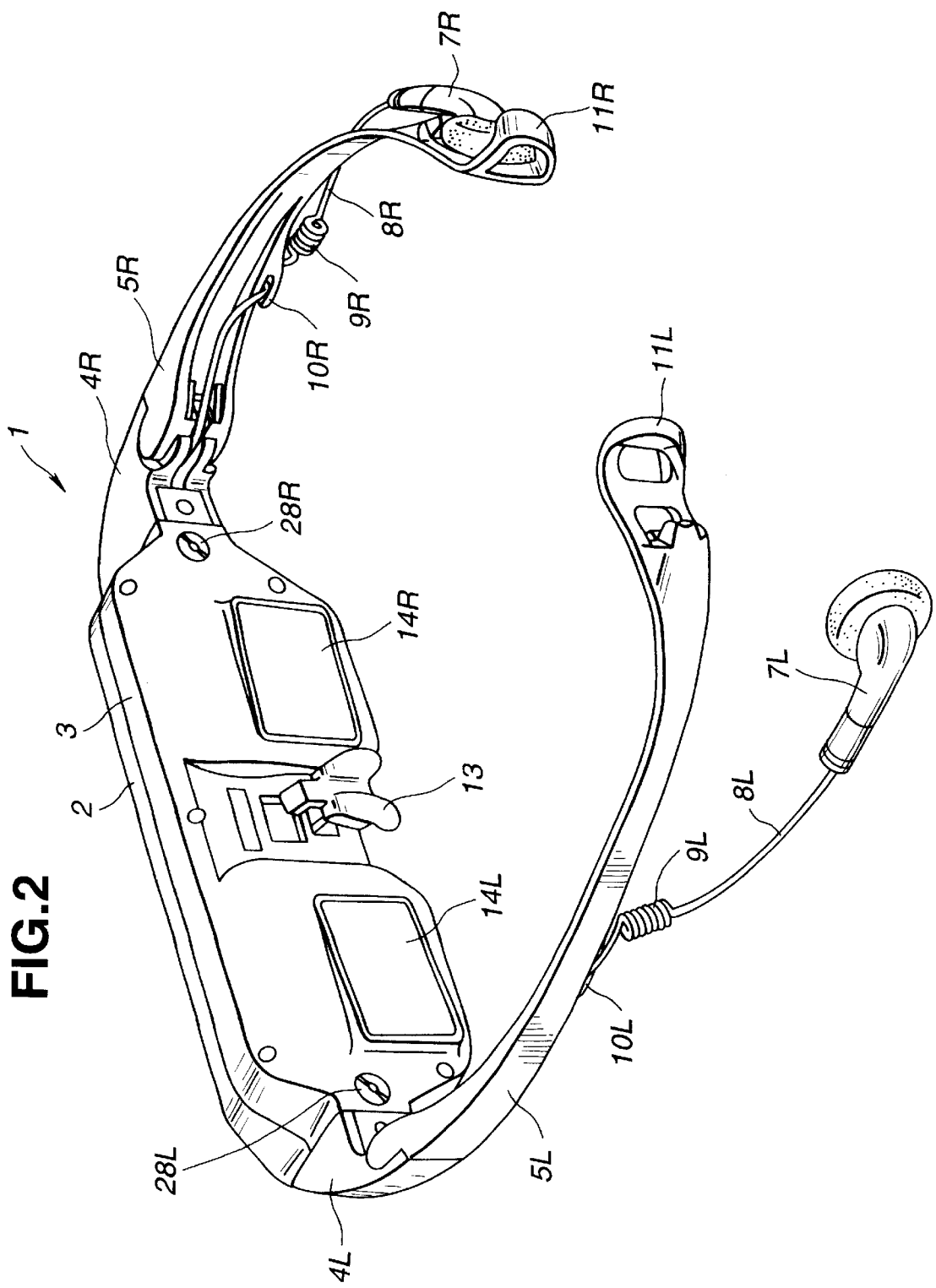
FIG. 2 is an oblique view showing the overall configuration of the head-mounted picture display device shown in FIG. 1 as seen from the back thereof.

FIG. 1 and FIG. 2 are oblique views showing the overall configuration of a head-mounted picture display device in accordance with an embodiment of the present invention. FIG. 1 shows the head-mounted picture display device as seen from the front face thereof. FIG. 2 shows the head-mounted picture display device seen from the back thereof.

Figure 3:
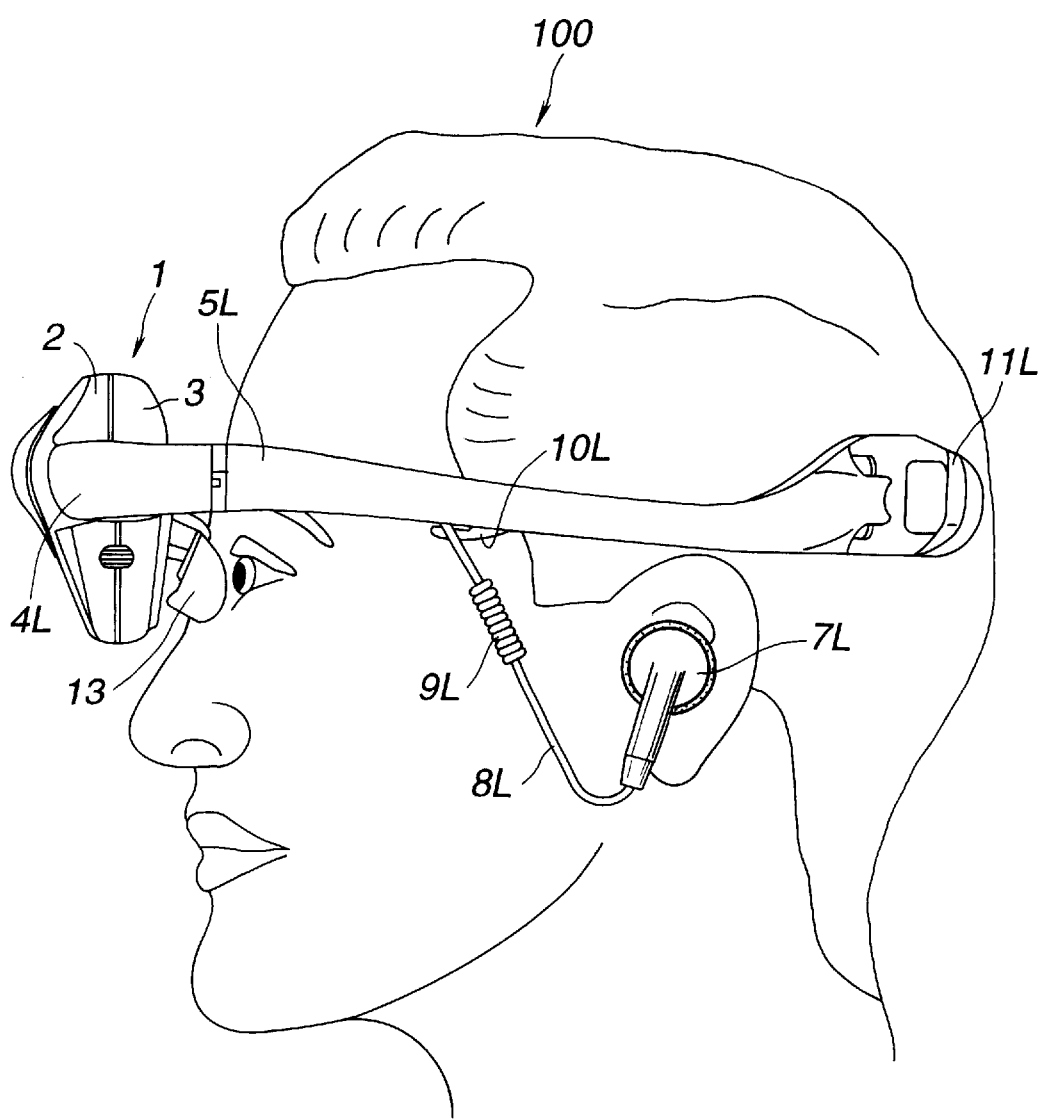
FIG. 3 is a side view showing an in-use state in which a wearer wears the head-mounted picture display device shown in FIG. 1, and which is seen from the wearer's left side.
Figure 4:
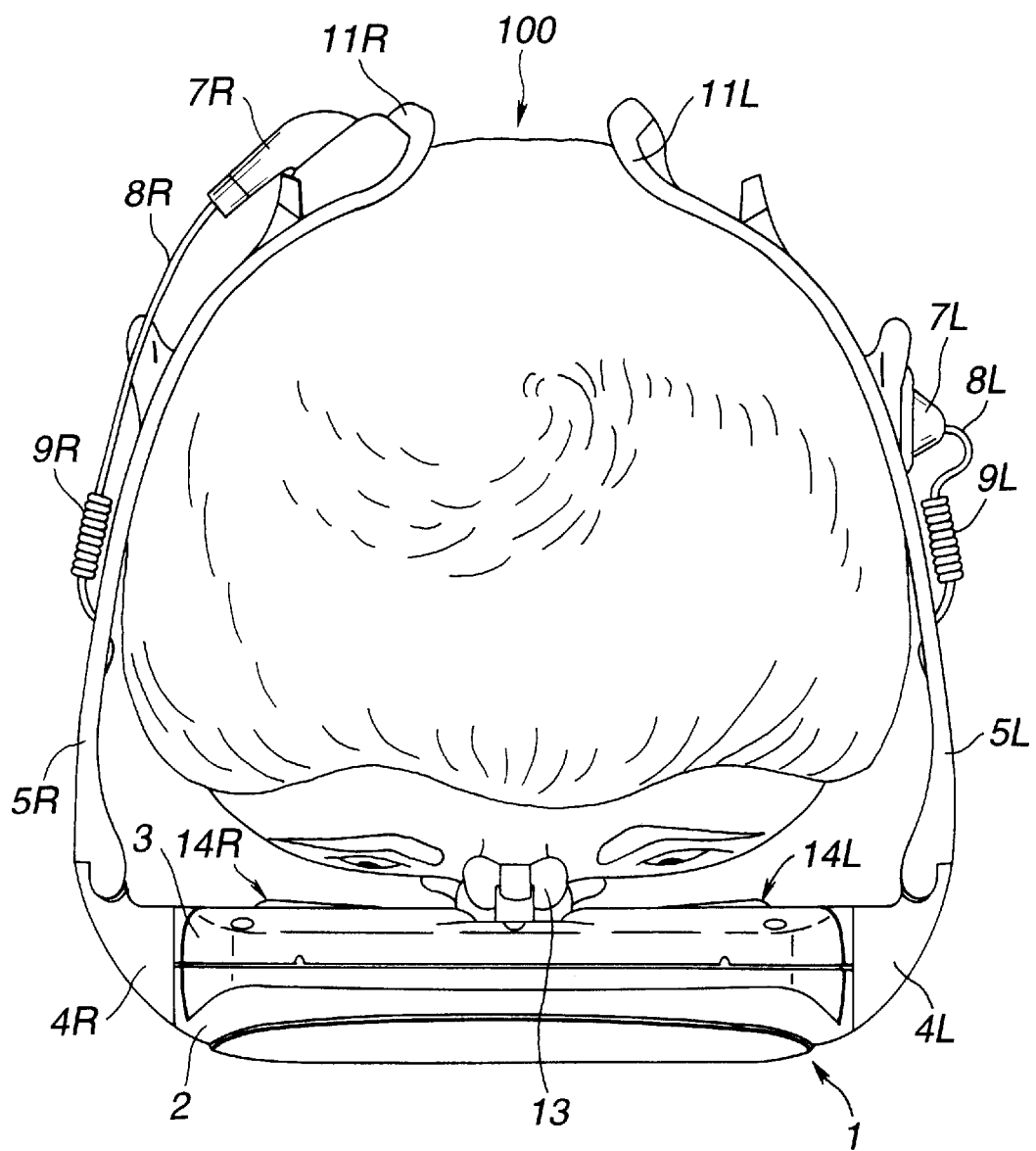
FIG. 4 is a top view showing an in-use state in which a wearer wears the head-mounted picture display device shown in FIG. 1, and which is seen from above the wearer's head.

FIG. 3 and FIG. 4 show an in-use state in which the head-mounted picture display device (HMD) of this embodiment is worn by a wearer. FIG. 3 is a side view showing the head-mounted picture display device as seen from the wearer's left side. FIG. 4 is a top view showing the head-mounted picture display device as seen from above the wearer's head.

FIG. 1 and FIG. 2 show the head-mounted picture display device with supporting frames opened for use. FIG. 2 shows the head-mounted picture display device with one earphone unit 7R held in an earphone holding mechanism 11R with the other earphone unit 7L removed from an earphone holding mechanism 11L.

FIG. 4 shows the head-mounted picture display device with one earphone unit 7R held in the earphone holding mechanism 11R in the left half of FIG. 4. Moreover, in the right half of FIG. 4, the other earphone unit 7L is removed from the earphone holding mechanism 11R and fitted in the left ear of a wearer 100.

Furthermore, the same reference numerals denote components having substantially the same functions and the same names and which are arranged on the left and right sides of a wearer wearing an HMD 1. In addition, members placed on the right side of the wearer are denoted by reference numerals ending with R. Members placed on the left side thereof are denoted by reference numerals ending with L.

The HMD 1 of this embodiment comprises a housing body, left and right supporting frames 5L and 5R, and joint members 4L and 4R. The housing body is formed to accommodate various members constituting a predetermined picture display system. The supporting frames 5L and 5R are worn on the left and right ears of the wearer 100 (FIG. 3 and FIG. 4), thus supporting the housing body in an observable posture. The joint members 4L and 4R link the housing body and the left and right supporting frames 5L and 5R.

The housing body is realized by joining a back housing body 3 and a front housing body 2. When the HMD 1 is worn and used by the wearer 100, the back housing body 3 occupies a position relatively closer to the face of the wearer 100. Correspondingly, the front housing body 2 occupies a position relatively further from the face of the wearer 100.

The picture display system accommodated by the housing body includes picture display members 14L and 14R (FIG. 2 and FIG. 4), an optical system, and an electrical printed circuit board. The picture display members 14L and 14R are liquid crystal displays (LCDs) each composed of a display element and a backlight for producing a picture represented by a supplied video signal. The optical system includes prisms for introducing beams which transmit the pictures produced by the picture display members 14L and 14R to the observer's (wearer 100) eyes. Drive circuits for driving the picture display members 14L and 14R are mounted on the electrical printed circuit board. The picture display system including these members has no direct relationship to the present invention. The details of the picture display system will therefore be omitted. Moreover, the illustration of those components accommodated within the housing body will be omitted.

As mentioned above, the front housing body 2 and back housing body 3 are joined to construct the housing body of the HMD 1. The joined surfaces of the front and back housing bodies are shown in FIG. 5.

Figure 5:
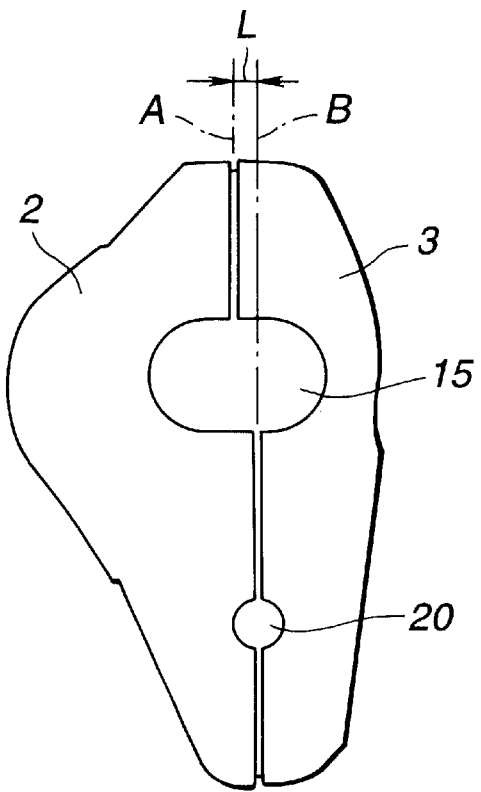
FIG. 5 is an enlarged side view showing a major portion of a housing of the head-mounted picture display device shown in FIG. 1, and showing the joined surfaces of front and back housing bodies.

FIG. 5 is an enlarged side view of a major portion of only the housing body of the HMD 1, showing the joined surfaces of the front housing body 2 and back housing body 3 constituting the housing body.

FIG. 5 shows the joined surfaces as seen from the left side of the wearer 100 of the HMD 1. The joined surfaces on the right side thereof are symmetrical to the illustrated ones and have substantially the same structure. The joined surfaces of the front and back housing bodies 2 and 3 will thus be described in conjunction only with FIG. 5.

As shown in FIG. 5, the upper and lower parts of the joined surfaces of the front and back housing bodies 2 and 3 are displaced from each other with respect to their back-to-front positions, with the displacement occurring at an aperture 15 in which the joint member 14L is fitted. In other words, the joined surface A of the front housing body and the joined surface B of the back housing body are formed to be offset in the back-to-front direction by a distance L between the upper and lower parts thereof.

Moreover, a lower aperture 20 is formed between the lower parts of the joined surfaces of the front and back housing bodies 2 and 3 on at least one side of the housing body. The lower aperture 20 is used to couple a cable 12 (FIG. 1) over which a video signal is supplied to the picture display system accommodated by the housing body. Moreover, a voice signal is supplied over the cable 12 to a voice production system formed with a printed circuit board for processing a voice signal and other elements to transmit sound. Control signals for driving and controlling the picture display system and voice production system are also transmitted over the cable 12, and power is supplied to the components over the cable 12. The cable 12 is only shown in FIG. 1 but has been omitted from the other drawings.

As shown in FIG. 1 to FIG. 4, the left and right supporting frames 5L and 5R are coupled to the side surfaces of the housing body via the joint members 4L and 4R. Specifically, one end of each of the joint members 4L and 4R is detachably coupled to the housing body through the apertures 15 (FIG. 5) which are bored in the side surfaces of the housing body. The proximal end of each of the left and right supporting frames 5L and 5R is coupled to the respective other end of the joint members 4L and 4R so that the left and right supporting frames can pivot freely.

The left and right supporting frames 5L and 5R are opened as shown in FIG. 1 to FIG. 4 for use. When the HMD 1 is stored, carried, or otherwise unused, the supporting frames 5L and 5R are turned inward, that is, towards the back of the housing body as with a pair of glasses. The frames 5L and 5R are thus folded and closed.

The inner-ear type earphone units 7L and 7R are mounted on the supporting frames 5L and 5R. The earphone units 7L and 7R serve as speakers such as compact loudspeakers formed with diaphragms or the like for supplying sound to the left and right ears of the wearer 100 of the HMD 1. The earphone units 7L and 7R can be fitted into the left and right ears of the wearer 100.

Loudspeaker cords 8L and 8R over which a voice signal sent from the voice production system stowed in the housing body is supplied to the earphone units 7L and 7R are coupled to the earphone units 7L and 7R. The loudspeaker cords 8L and 8R extend from the inside of the housing body and run along the inner walls of the left and right supporting frames 5L and 5R (FIG. 2).

The loudspeaker cords 8L and 8R are held in place by cord retaining portions 10L and 10R formed approximately at the middle of each of the supporting frames 5L and 5R. Stretch and contraction tolerating portions 9L and 9R are included along the distal portions of the loudspeaker cords 8L and 8R. The stretch and contraction tolerating portions 9L and 9R are designed to tolerate deformation in directions in which the loudspeaker cords may be stretched by a user of the HMD 1. When the loudspeaker cords are stretched due to an extraneous force, the stretch and contraction tolerating portions 9L and 9R exert tension toward the direction which returns the loudspeaker cords to a state of contraction. The earphone units 7L and 7R are coupled to the distal ends of the loudspeaker cords beyond the stretch and contraction tolerating portions 9L and 9R.

The cord retaining portions 10L and 10R serve the purpose of causing the loudspeaker cords 8L and 8R to be retained on the supporting frames 5L and 5R. Otherwise, if the wearer 100 wears the HMD 1 but does not fit the earphone units 7L and 7R into his/her left and right ears, the loudspeaker cords 8L and 8R would hang down behind the positions of the left and right eyes of the wearer 100.

The distal portions of the left and right supporting frames 5L and 5R are shaped to rest on positions near the occipital region of the head of the wearer 100 wearing the HMD 1.

Earphone holding mechanisms 11L and 11R for holding the earphone units 7L and 7R are formed as the distal parts of the left and right supporting frames 5L and 5R. The earphone holding mechanism 11L and 11R will be described in detail below.

Figure 6:
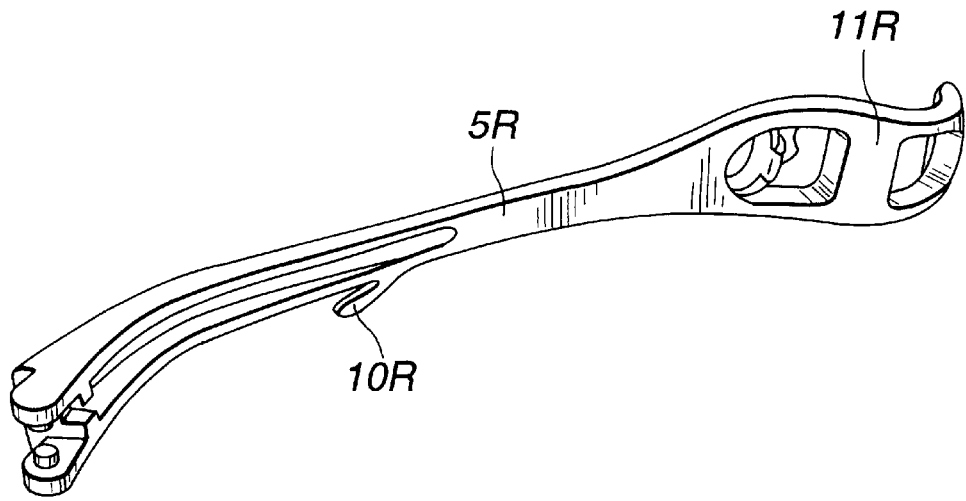
FIG. 6 is an enlarged oblique view showing a major portion of a right supporting frame of the left and right supporting frames included in the head-mounted picture display device shown in FIG. 1.
Figure 7:
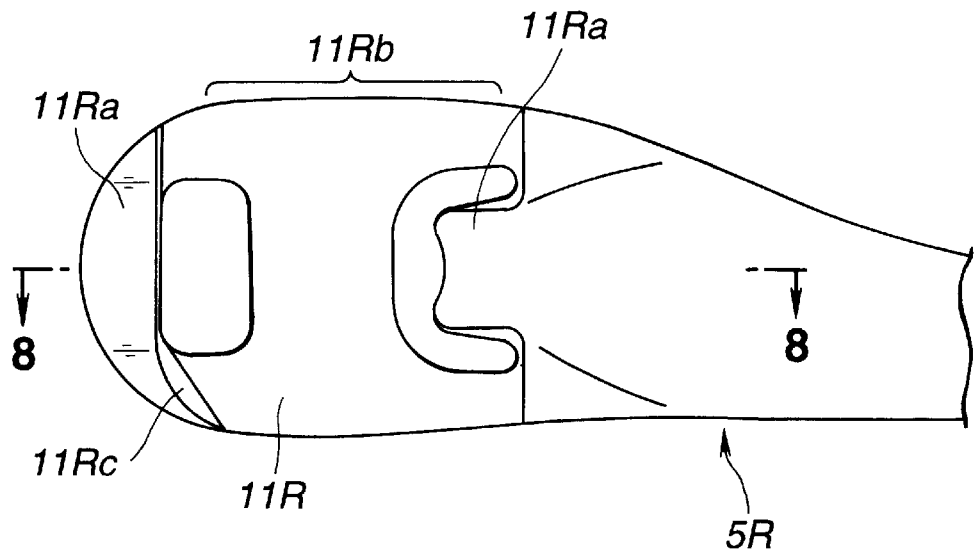
FIG. 7 is an enlarged view showing a major portion of the distal part of the supporting frame shown in FIG. 6.
Figure 8:
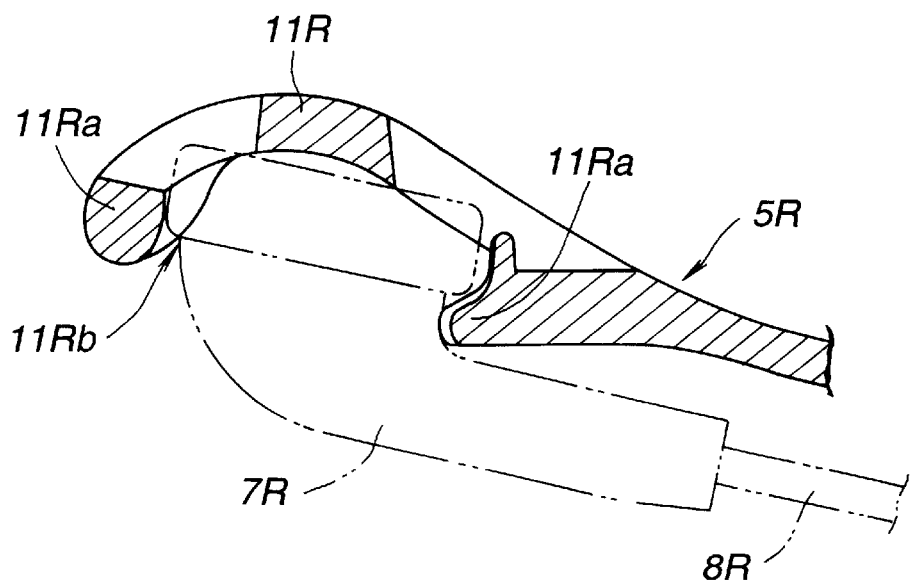
FIG. 8 is a sectional view along the 8—8 cutting plane of the distal part shown in FIG. 7.

FIG. 6 is an oblique view of an appearance showing the supporting frame 5R of the left and right supporting frames 5L and 5R. FIG. 7 is an enlarged view of a major component of the distal portion of the supporting frame 5R of the HMD 1. FIG. 8 is a sectional view along the 8—8 cutting plane of the distal portion shown in FIG. 7. The left supporting frame 5L has the same structure, though it is shaped symmetrically to the right supporting frame 5R. Thus, only the right supporting frame 5R will be described below in conjunction with FIG. 6 to FIG. 8.

The earphone holding mechanism 11R is, as shown in FIG. 6 to FIG. 8, molded as the distal part of the supporting frame 5R. The earphone holding mechanism 11R is formed as a concave part substantially along the contour of the earphone 7R (not shown in FIG. 6 and FIG. 7) (indicated with an alternating long and two short dashed line in FIG. 8).

Specifically, the earphone holding mechanism 11R is composed of a holding structure 11R, an intermediate portion 11Rb, and a receptor portion 11Rc. The holding structure 11Ra holds the earphone unit 7R in a normal position by enclosing a predetermined range of the outer surface of the earphone unit 7R substantially along the contour of the earphone unit 7R. The intermediate portion 11Rb opens upward for permitting the earphone unit 7R to be freed from a held state or from the holding structure 11Ra in a substantially upward direction with relatively small manipulating force applied. The receptor portion 11Rc stops the earphone unit 7R from being freed from the held state in any other direction.

Consequently, when the earphone holding mechanism 11R is holding the earphone unit 7R, the holding portion 11Ra forming part of the earphone holding mechanism 11R serves as the primary member for enclosing the earphone unit 7R.

Moreover, when the earphone holding mechanism 11R is holding the earphone unit 7R, the receptor portion 11Rc forming part of the earphone holding mechanism 11R serves to maintain the position of the earphone unit 7R in the earphone holding mechanism 11R and prevents the earphone unit 7R from coming off.

Furthermore the intermediate portion 11Rb is shaped so that, when a wearer wears the HMD 1, the earphone unit can be freed in a direction opposite to the wearer's head, that is, outward. Thus, when the HMD 1 is mounted, the earphone unit be readily detached or attached without hindrance from the intermediate portion 11Rb.

The length of the loudspeaker cord 8R is preferably determined as described below. Specifically, when the earphone unit 7R is held in a normal position of non-use, the loudspeaker cord 8R (FIG. 1 and FIG. 2) runs along the inner wall of the supporting frame 5R. Also, tension should be developed at the stretch and contraction tolerating portion 9R.

Due to the foregoing structure, the earphone units 7L and 7R are held in the earphone holding mechanism 11L and 11R under tension exerted on the earphone units 7L and 7R. Specifically, the earphone units 7L and 7R are biased frontward by stretching the stretch and contraction tolerating portions 9L and 9R of the speaker cords 8L and 8R against their naturally contracted state. This is because the earphone units 7L and 7R are attached to the ends of the loudspeaker cords 8L and 8R. The earphone units 7L and 7R can thus be readily held in the normal positions. In this manner, the earphone units 7L and 7R can be prevented from coming off unexpectedly.

In this embodiment, the normal positions of the earphone units 7L and 7R are such that the earphone units 7L and 7R are stowed and held at given positions on the distal portions of the supporting frames 5L and 5R, that is, stowed and held by the earphone holding mechanism 11L and 11R.

When not in use, the loudspeaker cords 8L and 8R, as shown in FIG. 1, FIG. 2, and FIG. 4 are retained substantially along the inner walls of the supporting frames 5L and 5R.

When the earphone units 7L and 7R are mounted in the earphone holding mechanisms 11L and 11R, the earphone units 7L and 7R are inserted into the open portions 11Lb and 11Rb. In particular, the earphone units 7L and 7R are inserted in a direction in which the loudspeaker cords 8L and 8R extend substantially orthogonally to the back-and-forth directions of the supporting frames 5L and 5R. The placement of the earphone units 7L and 7R at this location shall be referred to as the insertion position. The earphone units 7L and 7R are abutted on the receptor portions 11Lc and 11Rc. From this position, the earphone units 7L and 7R are turned and thus set in the normal position.

As mentioned above, the earphone holding mechanism 11L and 11R are structured so that the earphone units 7L and 7R are hard to remove when placed in the normal postures. On the contrary, when the earphone units 7L and 7R are placed in the insertion position, they are easily attached or detached. This results in easy attachment and detachment. Upon being attached, the earphone units 7L and 7R are easily placed in the normal positions. Consequently, the held states of the units 7L and 7R can be readily achieved.

The whole of the holding portion 11Ra or a given region thereof may be formed with an elastic material. In this case, the earphone units 7L and 7R can be attached or detached to or from the holding structure portions 11La and 11Ra irrespective of the positions thereof.

Generally, the earphone units 7L and 7R are provided with loudspeaker pads serving as buffers for comfort in the wearer's ears when the wearer is wearing the earphone units.

In the earphone holding mechanism 11L and 11R of the HMD 1 of this embodiment, the earphone units 7L and 7R capped with the loudspeaker pads can be mounted in the holding portions 11La and 11Ra.

When the earphone units 7L and 7R without the loudspeaker pads are mounted in the holding structure portions 11La and 11Ra, the earphone units can be restricted by adjusting the positions of the earphone units 7L and 7R as described above. However, when the earphone units 7L and 7R capped with the loudspeaker pads or the like are mounted in the holding portions 11La and 11Ra, the resultant outer dimension of the earphone units 7L and 7R becomes slightly larger. The earphone units 7L and 7R with the loudspeaker pads can thus be held by virtue of their elasticity and the tension supplied by the loudspeaker cords 8L and 8R. Even when the outer dimensions of the earphone units 7L and 7R deviate from a standard dimension, the earphone units can be held stably.

Furthermore, the holding portion 11Ra receives the outer surface of the earphone unit 7R. Thus, the earphone holding mechanism can protect the loudspeaker pad or the like from breaking when the earphone 7R is attached or detached to or from the holding portion 11Ra.

Moreover, normally when the HMD 1 is not in use, the earphone units 7L and 7R are held in the earphone holding mechanism 11L and 11R. Even with the earphone units 7L and 7R held in this manner, the HMD 1 can be mounted for use.

In other words, when the HMD 1 is used normally, the earphone units 7L and 7R are, as shown in FIG. 3 and FIG. 4, fitted in the wearer's left and right ears (see the right half of FIG. 4).

However, the earphone holding mechanisms 11L and 11R of the HMD 1 are located near the distal ends of the left and right supporting frames 5L and 5R. Specifically, when the wearer 100 is wearing the HMD 1, the distal parts of the supporting frames 5L and 5R are, as shown in FIG. 3 and FIG. 4, located at the occipital region of the head of the wearer 100 near the wearer's left and right ears.

As long as the earphone units 7L and 7R are held in the earphone holding mechanisms 11L and 11R (see the left half of FIG. 4), the earphone units 7L and 7R are located near the left and right ears of the wearer 100. Further, the speaker surfaces of the diaphragms included in the earphone units are facing the wearer. Thus, even when the earphone units 7L and 7R are held in the earphone holding mechanisms 11L and 11R, the wearer 100 can hear sounds transmitted by the units 7L and 7R.

When the earphone units 7L and 7R are held in the normal positions, the speaker surfaces of the diaphragms included in the units 7L and 7R are oriented inward, that is, opposed to the occipital region of the head of the wearer 100. Due to this structure, the diaphragms can be protected.

Furthermore, in consideration of the foregoing arrangement, the holding portions 11La and 11Ra of the earphone holding mechanisms 11L and 11R may be positioned as mentioned below. Specifically, when the earphone units 7L and 7R are held in the normal positions, the diaphragms of the unit 7L and 7R will be opposed to the ears of the wearer of the HMD 1.

With the above structure, even when the earphone units 7L and 7R are held in the earphone holding mechanism 11L and 11R, that is, held in the normal positions, the HMD 1 can be used to listen to sound transmitted by the units 7L and 7R. This arrangement results in a feeling of greater comfort to the wearer 100 after use.

On the other hand, when the wearer 100 is wearing the HMD 1 as shown in FIG. 2 to FIG. 4, a nose rest 13 is located substantially in the center of the housing body of the HMD 1. The nose rest 13 is located at a position so as to be coincident with the bridge of the wearer's nose and to abut thereon. The nose rest 13 thus supports the housing body and retains the HMD 1 in the mounted state.

Next, the description will be provided of the detailed structure of the coupled parts of the housing of the HMD 1 and the joint members 4L and 4R, and of the coupled parts of the joint members 4L and 4R and the left and right supporting frames 5L and 5R.

Figure 9:
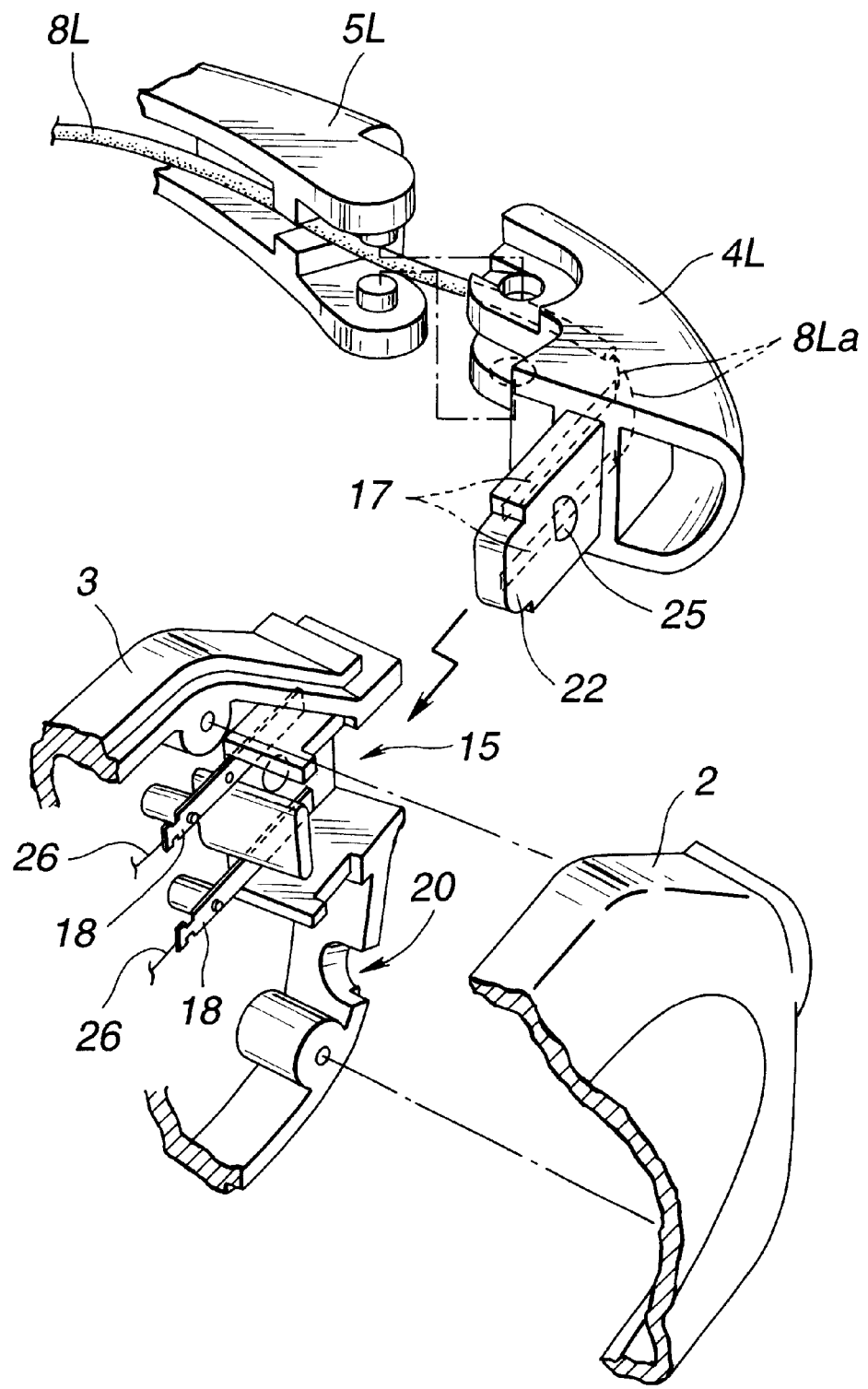
FIG. 9 is an exploded oblique view showing in enlargement a major portion of the coupled parts of the housing body, one joint member, and supporting frame of the head-mounted picture display device in FIG. 1.
Figure 10:
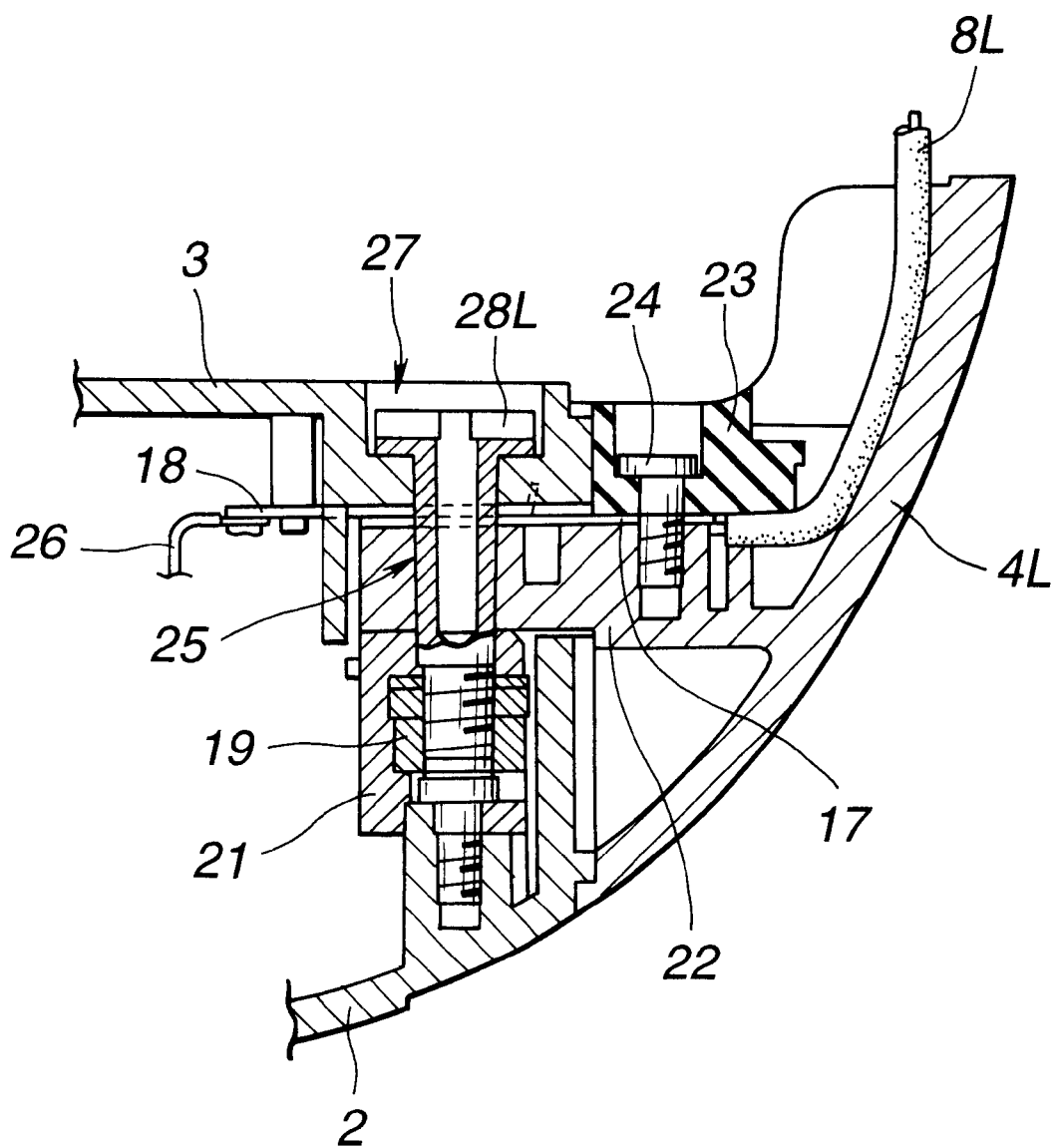
FIG. 10 is an enlarged cross sectional view showing a major portion of the coupled parts of the housing body and one joint unit of the head-mounted picture display device shown in FIG. 1, as seen from a top view.

FIG. 9 is an exploded oblique view of a major portion in enlargement of the coupled parts of the housing body of the HMD 1 of this embodiment, one joint member, and one supporting frame, FIG. 10 is an enlarged cross-section top view of a major portion of the coupled parts of the housing body and one joint member. FIG. 9 and FIG. 10 show the joint member 4L located on the wearer's left side and its surrounding structure. Hereinafter, the coupled part of the joint member will be described in conjunction with the drawings. The joint member 4R located on the wearer's right side and its surrounding elements are structured similarly, but symmetrically to the joint member 4L and its surrounding elements.

The body of the joint member 4L as viewed from above is shaped substantially like a sector of a circle. A fastening portion 22 is formed as an integral part of the coupling surface of the joint member 4L to be coupled with the surface of the housing body at a predetermined position on the coupling surface. The fastening portion 22 projects toward the housing body so that it will be embedded in an associated concave part of the housing body, that is, an aperture 15 (see FIG. 5).

A substantially D-shaped through-hole 25 is bored in the fastening portion 22. A screw 28L is penetrated through the through-hole 25. When the joint member 4L is fitted in the aperture 15 of the housing body and thus coupled with the housing body, the joint member 4L is fastened to the housing body with the screw 28L.

Moreover, the fastening portion 22 has metallic chips 17, which serve as relay contact chips, placed on one side surface thereof. Leads 8La bared from the loudspeaker cord 8L are connected to the chips 17. Chips 18 which serve as relay contact chips and formed with substantially the same members and shaped substantially similarly as chips 17 are located at predetermined positions on the housing body. At the predetermined positions, the chips 18 are opposed to the chips 17 when the joint member 4L is coupled to the housing body. Lead 26 over which a voice signal or the like is transmitted are connected to the chips 18. The leads 26 extend from a voice production system (not shown) accommodated by the housing body.

When the joint member 4L is coupled to the housing body, the chips 17 contact the chips 18 to attain electrical connection. A signal sent from the voice production system in the housing body is transmitted to the earphone unit 7L (not shown in FIG. 9 and FIG. 10) via the chips 18 and 17 over the loudspeaker cord 8L.

As shown in FIG. 10, a locking member 21 is formed as a boss at a position on the front housing body 2. The position coincides with the position of the through-hole 25 of the fastening portion 22 when the joint member 4L is embedded in the aperture 15 of the housing body and thus coupled with the housing body. A metallic nut 19 is screwed onto the locking member 21.

Furthermore, a through-hole 27 through which the screw 28L is penetrated is bored in the back housing body 3. The through-hole 27 is bored so as to be opposed to the locking member 21. The through-hole 27 is stepped to prevent the head of the screw 28L from sitting up above the surface of the back housing body 3.

The fastening portion 22 of the joint member 4L is embedded in the aperture 15 of the housing body and the joint member 4L is thus coupled with the housing body. In this state, when the screw 28L is inserted into the through-hole 27, the screw 28L penetrates through the through-hole 25 of the fastening portion 22. The distal threaded portion of the screw 28L reaches the nut 19 of the locking member 21, whereupon the screw 28L is screwed into the nut 19. Thus, the housing body and joint member 4L are fully coupled with each other.

The housing body and joint member 4L is firmly secured when screwed together using the single screw 28L.

Furthermore, in this arrangement, the contact surfaces of the chips 17 and 18 are in contact with each other. When the housing body and joint member are secured by the screw 28L, the chips 17 and 18 are firmly pressed against each other.

The aforesaid supporting frames 5L and 5R are molded using a compound containing a polycarbonate resin and polyester resin, for example, Iypilon MB2112 (manufactured by Mitsubishi Gas Chemical Co., Inc.).

Iypilon MB2112 is a compound containing, for example, polycarbonate, polyethylene terephthalate, and acrylic elastomer. The percentages in weight of these components are such that polycarbonate is 75% or less, polyethylene terephthalate is 20% or less, and acrylic elastomer is 5% or less. Iypilon MB2112 exhibits excellent chemical resistance and heat resistance on a level with Iypilon MB2106 which is a widely used chemical-resistant chemical containing polycarbonate. Moreover, Iypilon MB2112 is an improvement over Iypilon MB2106 in terms of color regularity.

A stress corrosion test conducted on Iypilon Mb2112 will be described with reference to Table 1.

|  | Tensile strength ($kg/cm^2$) | |
| --- | --- | --- |
|  | Blank | After stress corrosion test |
| MB2112 | 580 | 490 |
| S-2000 | 610 | Fractured but remained as one piece |

Table 1 lists the results of measurement of tensile strengths. For the measurement, samples of Iypilon MB2112 and Iypilon S-2000 of a standard grade were strained by 1%, and a chemical thinner (T-800 revised) was applied to the most-stressed portions. The tensile strengths of the samples were measured 24 hours later.

As apparent from the results of the above test, Iypilon S-2000 was fractured but remained as one piece (not separated). In contrast, Iypilon MS2112 sustained a tensile strength of 490 $kg/cm^2$ even after the conduction of the stress corrosion test. Therefore, such testing demonstrates that Iypilon MB2112 is superior in corrosion resistance.

The supporting frames 5L and 5R are, as mentioned above, molded using Iypilon MB2112. The supporting frames can therefore maintain elasticity, to accommodate differences in the shape and size of the observer's head. Furthermore, Iypilon MB2112 is chemically resistant. Thus, when an observer using a hair treatment agent or the like wears the HMD, the elasticity will hardly be deteriorated. The supporting frames 5L and 5R will never be bent or broken in the long-term with normal use. Safety and durability of the HMD 1 can thus be further improved.

While the supporting frame 5L and 5R are preferably molded using a compound containing a polycarbonate resin and polyester resin, the joint members 4L and 4R and the other members may also be made of the same material.

As mentioned above, according to the described embodiment, the housing body is designed to be divided into two back-to-front portions. The upper and lower parts of the joined surfaces of the front and back housing bodies 2 and 3 are displaced from each other with respect to their back-to-front positions, with the displacement occuring at the aperture 15. This structure is helpful in outlining the housing body along the contour of the picture display system whose depth or back-to-front dimension tends to be greater at a level position that is a vertically intermediate position. Thus, the HMD 1 can be designed compactly.

Although the upper and lower parts of the joined surfaces of the front and back housing bodies 2 and 3 are displaced from each other at the aperture 15, the restrictions in precision imposed on the joined surfaces can be alleviated without making the manufacturing process complex or increasing the cost of manufacturing.

The earphone holding mechanisms 11L and 11R in which the earphone units 7L and 7R are held are formed as concave parts near the distal ends of the left and right supporting frames 5L and 5R. When the earphone units 7L and 7R are held in the supporting frames 5L and 5R, the earphone units 7L and 7R can be mounted without projecting outward. The supporting frames 5L and 5R having the earphone units 7L and 7R held therein can therefore be shaped thinly.

The HMD 1 may be worn or taken off with the earphone units 7L and 7R held in the earphone holding mechanisms 11L and 11R. Nevertheless, since the supporting frames 5L and 5R are shaped without any projecting parts, the distal part of the supporting frame 5L and 5R will not become caught by the wearer's hair or the like. Thus, the HMD 1 can be mounted or taken off smoothly.

Furthermore, the loudspeaker cords 8L and 8R run along the supporting frames 5L and 5R with the earphone units 7L and 7R stowed in the supporting frames 5L and 5R. The loudspeaker cords 8L and 8R can thus be arranged efficiently.

Moreover, the shape of the earphone holding mechanisms 11L and 11R can be readily manufactured by a standard molding process. The cost of manufacturing can be suppressed without an increase in the number of steps in the manufacturing process.

On the other hand, the joint members 4L and 4R have the predetermined fastening portions 22 thereof embedded in the associated concave parts. The joint members 4L and 4R are screwed to the predetermined locking members 21, which extend to the inside of the housing body, using the single screws 28L and 28R that are inserted into the through-holes of the fastening portions 22. The contact surfaces of the chips 17 of the joint members 4L and 4R and the contact surfaces of the chips 18 extending from the housing body are firmly pressed against each other when the two parts are screwed together. Thus, imperfect contact can be prevented.

Moreover, numerous members are fastened together using the single screws 28L and 28R. This leads to a decrease in the number of components involved in the assembly process. Since the chips 17 and 18 are pressed against each other when the parts are screwed together, the two sets of two chips 17 and 18 can be made thinner without the need to take into account the strength of the contact surfaces.

Furthermore, the through-holes 25 are shaped like the letter D. The joint members 4L and 4R are therefore pulled towards the housing body by means of the screws 28L and 28R. The joint members 4L and 4R can therefore be reliably coupled to the housing without any gap between them. The quality of the HMD 1 can be improved in terms of its appearance. Moreover, there is no backlash (gap) between members. This contributes to an improvement in the strength of the HMD 1 itself which is constructed by assembling a plurality of members.

The joint members 4L and 4R are, as mentioned above, provided for linking the housing body and the left and right supporting frames 5L and 5R. In this embodiment, the joint members are formed as separate members. The present invention is not limited to this structure. Alternatively, other elements having substantially the same functions as the joint members 4L and 4R and linking the housing body and the left and right supporting frames 5L and 5R may be substituted for the joint members 4L and 4R. Such elements may be formed as integral parts of the left and right supporting frames 5L and 5R.

Moreover, in the HMD 1 of the aforesaid embodiment, the earphone units 7L and 7R are held in the left and right supporting frames 5L and 5R. The present invention is not limited to this structure. An earphone unit may be placed in only one of the left and right supporting frames 5L and 5R. If an earphone unit is placed in one supporting frame alone, the associated cord retaining portion and earphone holding mechanism should only be formed in the respective supporting frame.

The supporting frames 5L and 5R are molded using a compound containing a polycarbonate resin and polyester resin. Consequently, appropriate elasticity can be sustained irrespective of the shape and size of the observer's head, without exceeding the stress limit of the frames. Even when an observer using a hair treatment agent or the like wears the HMD, the elasticity will hardly be deteriorated. Safety and durability of the device can thus be further improved.

In the present invention, it is apparent that a wide range of different working modes can be formed based on the disclosure without departure from the spirit and scope of the invention. This invention is not restricted by any specific embodiment disclosed herein but instead is limited by the appended claims.

What is claimed is:

1. A head-mounted picture display device, comprising:
a picture display system including picture display members for producing pictures represented by a supplied video signal and prisms for introducing beams which transmit the pictures produced by the picture display members to an observer's eyes;
a housing body accommodating the picture display system;
left and right supporting frames adapted to be placed on the observer's left and right ears for thus supporting the housing body in an observable position; and
joint members for linking the housing body and the left and right supporting frames,
wherein the housing body is realized by a back housing body joined to a front housing body, wherein the back housing body occupies a position closer to the observer's face relative to the front housing body when the display is mounted on the observer's head,
wherein the joined surfaces of the back and front housing bodies have upper and lower parts defined with respect to an aperture formed along the joined surfaces, the upper and lower parts of the joined surfaces being displaced from each other in terms of their back-to-front positions at the aperture, and
wherein the joint members are fitted into the housing body at the aperture on each side of the housing body.

2. A head-mounted picture display device according to claim 1, wherein one or both of the left and right supporting frames have cord retaining portions for, when the observer wears the head-mounted picture display device, but does not place the earphones in his/her ears, retaining cords over which a voice signal is supplied to the earphones.

3. A head-mounted picture display device, comprising:

a picture display system including picture display members for producing pictures represented by a supplied video signal and prisms for introducing beams which transmit the pictures produced by the picture display members to an observer's eyes;

a housing body accommodating the picture display system;

left and right supporting frames adapted to be placed on the observer's left and/or right ears for thus supporting the housing body in an observable position;

joint members for linking the housing body and the left and right supporting frames; and earphones for supplying sound to the observer's left and/or right ears, wherein one or both of the left and right supporting frames have earphone holding mechanisms for holding the earphones at predetermined regions thereof and which are adapted to be placed near the observer's ears when the display device is worn, and wherein the earphone holding mechanisms each include a holding portion for holding an earphone in a normal position while enclosing a predetermined range of the outer surface of the earphone substantially along the contour of the earphone, an intermediate portion for permitting the earphone to be freed from the held state in a substantially upward direction upon the application of a relatively small manipulating force, and a receptor portion for hindering the earphone from being freed in any other direction.

4. A head-mounted picture display device according to claim 3, wherein at least a part of the holding portion of the earphone holding mechanisms is formed of an elastic material.

5. A head-mounted picture display device according to claim 3, wherein when the earphones are retained in the normal positions, the holding portions of the earphone holding mechanisms have the diaphragms thereof opposed to the wearer's ears.

6. A head-mounted picture display device, comprising:

a picture display system including picture display members for producing pictures represented by a supplied video signal and prisms for introducing beams which transmit the picture produced by the picture display members to an observer's eyes;

a housing body accommodating the picture display system;

left and right supporting frames adapted to be placed on the observer's left and right ears for thus supporting the housing body in an observable position;

joint members for linking the housing body and the left and right supporting frames;

earphones for supplying sound to the observer's left and/or right ears, wherein the joint members are each secured to a boss extending inside the housing body by means of a single screw that penetrates through a through-hole bored in a fastening portion of the joint member at a position at which the fastening portion is embedded in an associated concave part of the housing body; and relay contact chips extending from the inside of the housing body and the joint members, respectively, for transmitting sound signals, are firmly pressed against each other upon securing the joint members to the housing body by the screw.

7. A head-mounted picture display device, comprising;

a picture display system including picture display members for producing pictures represented by supply video signal and prisms for introducing beams which transmit the picture produced by the picture display members to an observer's eyes;

a housing body accommodating the picture display system;

left and right supporting frames adapted to be placed on the observer's left and right ears for thus supporting the housing body in an observable position;

joint members for linking the housing body in the left and right supporting frames;

earphones for supplying sound to the observer's left and/or right ears, wherein the joint members are each secured to a boss extending inside the housing body by means of a single screw that penetrates through a through-hole board in a fastening portion of the joint member at a position at which the fastening portion is embedded in an associated concave part of the housing body; and relay contact chips extending from the inside of the housing body and the joint members, respectively, for transmitting sound signals, are firmly pressed against each other upon securing the joint members to the housing body by the screw; and, wherein the through-holes of the joint members are shaped so that when the screw has not been penetrated through the through-hole, a portion of the inner circumferential wall of the through-hole relatively near the inside of the housing body will project inward, the projecting portion being designed to deform so as to withdraw due to pressure from the outer circumference of the screw upon penetration of the screw, and the joint members are thus pressurized firmly towards the inside of the housing body due to the pressure.

8. A head-mounted picture display device, comprising:

a picture display system including picture display members for producing pictures represented by supply video signal and prisms for introducing beams which transmit the pictures produced by the picture display members to an observer's eyes;

a housing body accommodating the picture display system;

left and right supporting frames adapted to be placed on the observer's left and/or right ears for thus supporting the housing body in an observable position;

joint members for linking the housing body and the left and right supporting frame;

earphones for supplying sound to the observer's left and/or right ears, wherein one or both of the left and right supporting frames have earphone holding mechanisms for holding the earphones at predetermined regions thereof and which are adapted to be placed near the observer's ears when the display device is worn, and wherein the earphone holding mechanisms each include a holding portion for holding an earphone in a normal position while enclosing a predetermined range of the outer surface of the earphone substantially along the contour of the earphone, an intermediate portion for permitting the earphone to be freed from the held state in a substantially upward direction upon the application of a relatively small manipulating force, and a receptor portion for hindering the earphone from being freed in any other direction; and, wherein the earphones each have a cord over which a voice signal is supplied to each earphone and which has a stretch and contracting tolerating portion for tolerating stretching of the cord while producing tension toward the direction in which the cord is contracted;

the holding portions of the earphone holding mechanism are each molded as a concave part formed to substantially correspond to the contour of each earphone at a position near the back end of each supporting frame, such that when each earphone is retained in a normal position, the cord is extended along the respective frame so that the stretch and contraction tolerating portion will be tensioned.

9. A head-mounted picture display device, comprising:

a picture display system including picture display members for producing pictures represented by a supplied video signal and prisms for introducing beams which transmit the pictures produced by the picture display members to an observer's eyes;

a housing body accommodating the picture display system;

left and right supporting frames adapted to be placed on the observer's left and right ears for thus supporting the housing body in an observable posture; and joint members for linking the housing body and the left and right supporting frames, wherein the supporting frames are molded using a compound containing a polycarbonate resin and polyester resin.

* * * * *